United States Patent
Wruck et al.

[11] Patent Number: 6,041,264
[45] Date of Patent: Mar. 21, 2000

[54] DEADBAND CONTROL ASSISTANT ELIMINATING OFFSET FROM SETPOINT

[75] Inventors: Richard A. Wruck, Mt. Prospect; Gideon Shavit, Highland Park, both of Ill.

[73] Assignee: Honeywell Inc., Minneapolis, Minn.

[21] Appl. No.: 08/789,732

[22] Filed: Jan. 27, 1997

[51] Int. Cl.[7] .................................................. G05B 13/02
[52] U.S. Cl. ........................ 700/40; 700/42; 700/48; 700/49
[58] Field of Search ..................... 318/561, 610, 318/611, 624; 454/61; 700/29, 33, 34, 35, 37, 40–43, 71, 72, 73, 80, 77, 78, 47–50, 54

[56] References Cited

U.S. PATENT DOCUMENTS

| | | |
|---|---|---|
| 3,794,817 | 2/1974 | Shinskey .................................. 364/177 |
| 4,509,110 | 4/1985 | Levesque, Jr. et al. ................ 364/153 |
| 4,604,681 | 8/1986 | Sakashita ................................ 364/183 |
| 4,885,676 | 12/1989 | Zweighaft ............................... 364/178 |
| 5,405,291 | 4/1995 | Alcorn et al. .............................. 454/61 |

Primary Examiner—William Grant
Assistant Examiner—Steven R. Garland
Attorney, Agent, or Firm—Robert B. Leonard

[57] ABSTRACT

A deadband control assistant, operating as part of a control system, eliminates oscillation of a controlled process output around a desired setpoint. The deadband control defines a deadband range, and steady-state-stabilization-time for the process being controlled. When the process output is within the deadband range and oscillation around the setpoint occurs for the steady-state-stabilization-time, the error is set to zero. The control signal may simultaneously be set, or may settle to a fixed value. The deadband control assistant thus allows the process output to stabilize as close as possible to the desired setpoint. Normal process control may resume once the process output strays outside the deadband range.

25 Claims, 7 Drawing Sheets

DEADBAND CONTROL ASSISTANT ELIMINATING OFFSET FROM SETPOINT

BACKGROUND OF THE INVENTION

Two major causes for oscillation in a control system are the presence of hysteresis and incorrect setting of the control parameters with respect to the process being controlled. The latter may be eliminated using advanced control techniques, such as with Neural Network-based controllers, or other controller types providing adaptive control for non-linear processes. The hysteresis is due to the friction in the mechanical elements of the control system such as valves, actuators, slack in associated linkages, and gear backlash, as well as some electrical characteristics of some components (for example the inductance of a solenoid). This oscillation may not be eliminated by presently available control techniques. Hysteresis manifests itself by a temporary lack of response whenever the mechanical device, for example, an actuator, changes direction. The temporary lack of response is due to the frictional or other forces in the system which must be overcome before movement occurs. The force needed to overcome the friction or other forces, once movement begins, is translated to momentum. This momentum causes the measured process output to exceed the setpoint or desired process output, requiring a second correction signal to recompensate. This correction signal will again lead to another momentum component, requiring a reverse correction. Repeated corrections are thus required, even during periods in which the setpoint remains constant. The oscillation causes premature wear of mechanical parts by causing unnecessary repetitive motion. The motion is also wasteful because energy must be expended by the system to maintain the oscillations.

In the HVAC marketplace, hysteresis is mostly related to mechanical factors and it is more critical with pneumatic control due to the added friction in the control devices. Electronic controllers and electronic actuators reduce the inherent hysteresis in the system, but cannot eliminate it entirely. Thus while in some systems hysteresis may be reduced by choice of control components, it may not be totally eliminated. Furthermore, in some applications, use of components that exhibit large hysteresis may be required to satisfy specific application requirements.

Since there are no known theoretical solutions to overcome hysteresis, the prior art response to hysteresis involves recognizing the occurrence of hysteresis in a system, and then fixing the control signals. This is done using a deadband control assistant which takes over control of the process from a normal control device (e.g. opens the control loop) when oscillation is recognized. In the prior art deadband control methods, a region is predefined around the setpoint in which oscillation is likely; this region is defined as the deadband range, having an upper and a lower deadband limit. Whenever the monitored process condition or process output, for example, temperature, enters the deadband range, the error of the system is set to zero. Subsequent calculations by the control system of the control signal are performed as if the error were zero.

While this solution can eliminate oscillation during quasi-steady-state conditions (hereinafter simply quasi-steady-state), it can result in a significant offset from the actual setpoint by as much as one-half the deadband range. The larger this offset, the greater the chance that a change in setpoint may not be registered by the control system. (For example, if the process output lies equidistant from the old and new setpoints.)

The large steady state offset occurs because the prior art deadband methods do not recognize when the control system is exhibiting a dynamic operation (which occurs during normal operation or under normal conditions when the process is approaching the setpoint) versus quasi-steady-state operation (when the error between desired and measured process output will not improve significantly). Enabling deadband control in a process exhibiting dynamic operation results in control perturbations and temporary instability. Prior art deadband control methods eliminate the dynamic operation-related instability by sacrificing system response time or sizing the deadband range large enough to contain setpoint overshoot.

Thus there is some need for a deadband control assistant which brings the process as close as possible to the setpoint without the offset previously caused by prior art deadband control methods. The resulting control system will have higher accuracy, since it reduces the wide range around the setpoint where the prior art deadband control assistant could not operate. At the same time, such a system would provide the oscillation control necessary to reduce mechanical part wear, and increase energy efficiency by eliminating the energy unnecessarily used to support oscillation around the setpoint.

SUMMARY OF THE INVENTION

The invention described herein is a process and apparatus which provides deadband control of a process operating in quasi-steady-state. The controlled process may be defined by an error or error value and a control equation. The error value represents the deviation of a measured process output from a desired setpoint for that process output. The control equation is used to determine the control signal to be supplied to the process during normal conditions or normal operation. The control signal then causes the measured process output to move in the direction of the desired setpoint.

A deadband control assistant, operating as part of the control system, eliminates oscillation of the measured process output around the desired setpoint during quasi-steady-state conditions. The deadband control assistant defines a deadband range, and a predetermined time period, called the steady-state-stabilization-time, for which the measured process output oscillates around the setpoint. When the measured process output is within the deadband range for the steady-state-stabilization-time, the error value is set to zero, whereby the measured process output assumes a value with minimal offset from the desired setpoint. Normal operation by the control equation may resume once the error indicates that the measured process output has strayed outside the deadband range.

An apparatus may be understood directly from the above description of the process and the following specification.

DETAILED DESCRIPTION OF THE INVENTION

In a typical PID-type controller, a PID control equation, which defines the control signals used to control a process, might be written as:

$$u_{PID} = \frac{100 E_K}{X_P} + \frac{100}{X_P T_n} \int E + \frac{100 T_v}{X_P} \dot{E}, \qquad (1\text{-}1)$$

where $X_P$ represents a throttling range or proportional band, $E_K$ represents the current error, and $\int E$ and $\dot{E}$ represent the integral of the error over some time period and the derivative of the error over some time period, respectively. Tn and Tv are controller parameters which define characteristics of the controller's response to process changes. Many modern PID-type systems implement control in a digital environment, and thus do not work with continuous data, instead working with samples. Equation 1-1 above, therefore can be converted to a format which lends itself to discrete data. One representation of equation 1-1 might be:

$$U_{PID} = \qquad (1\text{-}2)$$
$$\frac{100 E_K}{X_P} + \left(\frac{100}{X_P T_n}\right) * \left(\sum_1^K E_n\right) * t_0 + \left(\frac{100 T_v}{X_P}\right) * \left(\frac{E_K - E_{K-1}}{t_0}\right),$$

Where:
$E_K$ Current error sample (or W-X)
$E_{K-1}$ Last error sample
$E_n$ A past error sample being added to the sum
$t_o$ time between each sample
Tn integral action time
Tv derivative action time
W setpoint
X current process output sample
$X_P$ throttling range In this equation, the term containing $E_K$ will be referred to as the error term. The term containing the summation will be called the integral error term, and the remaining term will be referred to as the derivative error term.

Other equations are, of course possible, and this one is given for illustrative purposes for the discussion below.

Figure 1:
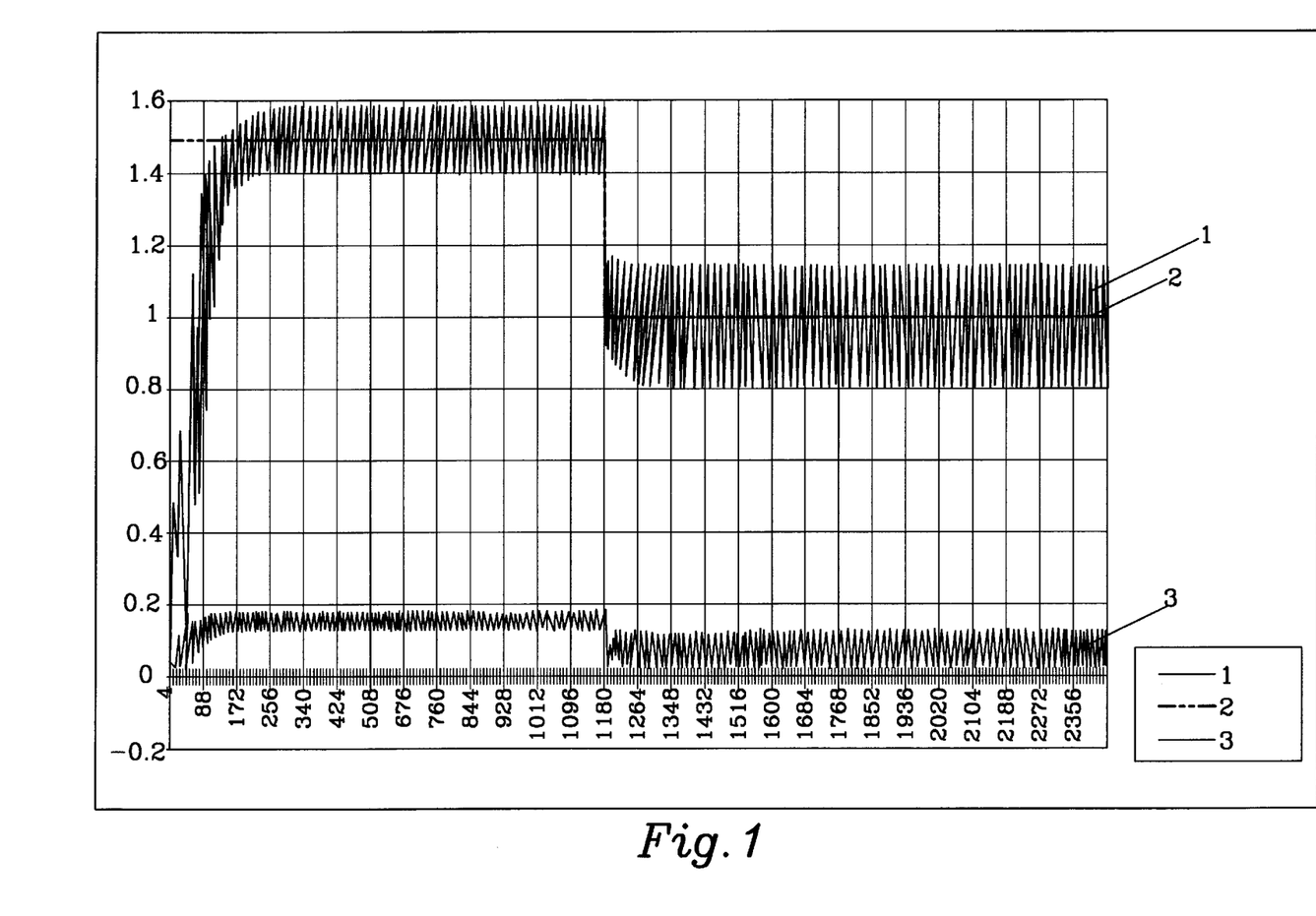
FIG. 1 shows a graphical representation of output for a process including device hysteresis, with no deadband control assistance.
Figure 1A:
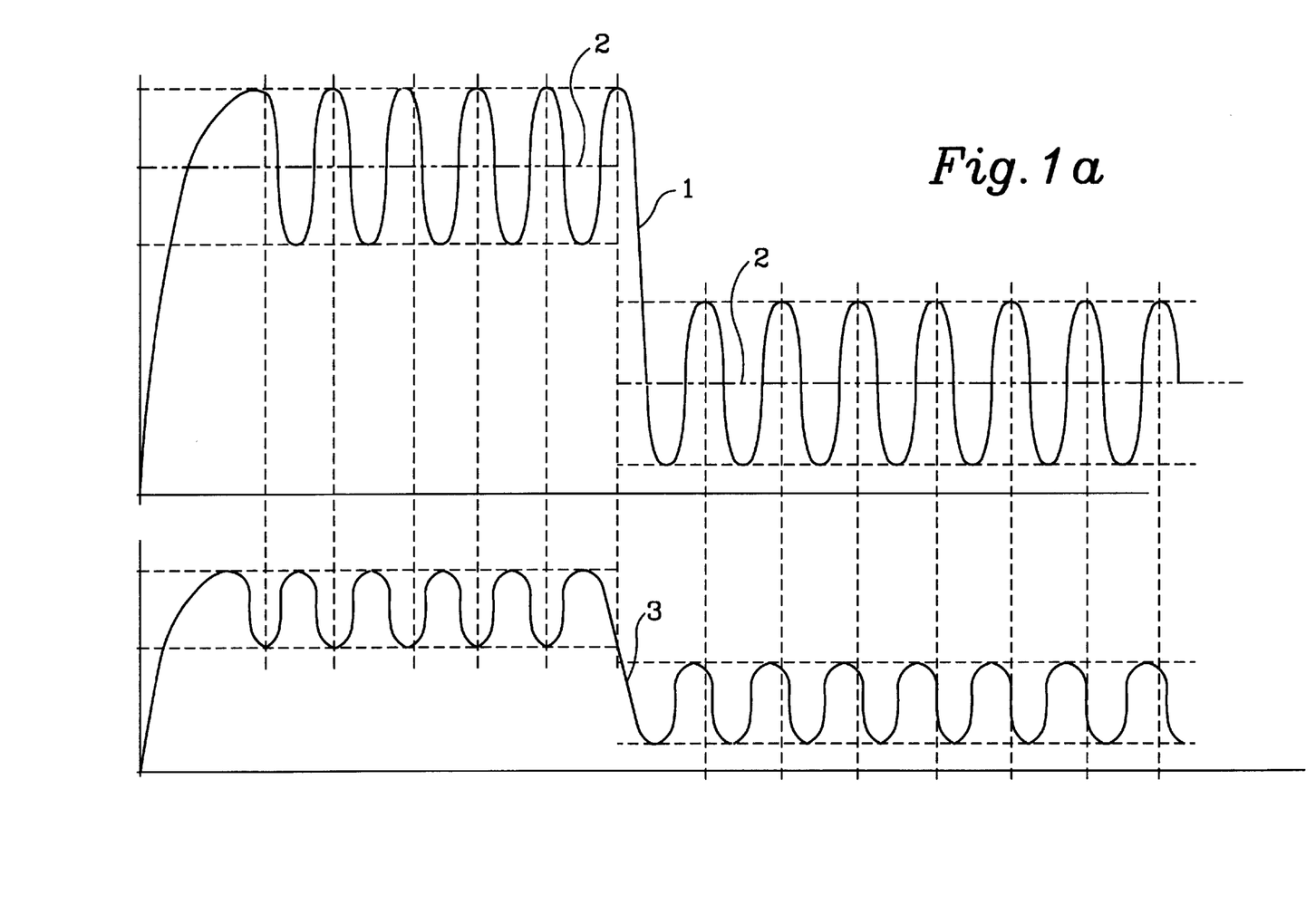
FIG. 1a shows a graphical representation of output for a process, including device hysteresis, with no deadband control assistance, at a lower oscillation frequency than shown in FIG. 1.

By using equation 1-2 without a deadband control assistant, oscillation often occurs where physical devices such as actuators or valve linkages are involved. Thus, the output of such a control equation, might appear as shown in FIG. 1. In the graph, the upper signal 1, represents measured process output over time. The measured process output may be called, and will be referred to simply as process output for the purposes of this application. In FIG. 1, the process being measured is pressure. The actual setpoint 2 for the process output lies along the center of the oscillation. That is, the control equation causes the process output to swing above and below the setpoint in oscillation. FIG. 1a shows a hypothetical graphical representation of output for a process including device hysteresis, with no deadband control assistance at a lower oscillation frequency than shown in FIG. 1. The control signal applied to a control device is depicted on the lower part of the graphs of FIGS. 1 & 1a.

Movement of the process output is caused directly by the control device, which receives the control signal determined using the control equation, and alters the process accordingly.

As indicated, operating the control device may constitute opening a damper or energizing an actuator. For each swing, the control device expends energy moving the process output again toward the setpoint, overshooting the setpoint, and leaving the process output on the other side of the setpoint, where the control signal will again compensate, and send the process output back to the other side of the setpoint.

The prior art response to the oscillation problem was a simple one. Recognize a range around the setpoint where the process output is likely to oscillate, and fix the control signal when the process output falls within this range, identified as the deadband range. The deadband range, is typically made as small as possible (because it determines the lower limit of sensitivity of the controller to the setpoint), but must be larger than the oscillations caused by the control equation, (or quasi-steady-state will not be recognized at all). To implement this method, once the process output falls within the deadband range, the error ($E_K$) used in the control equation is set to zero. With the error in the control equation zero, the control signal will reflect the fact that there is no error from the setpoint, and the process output will eventually assume a single value. The process output must still be monitored for real error however, so that normal process control may resume if the process output strays outside the deadband range.

Figure 2:
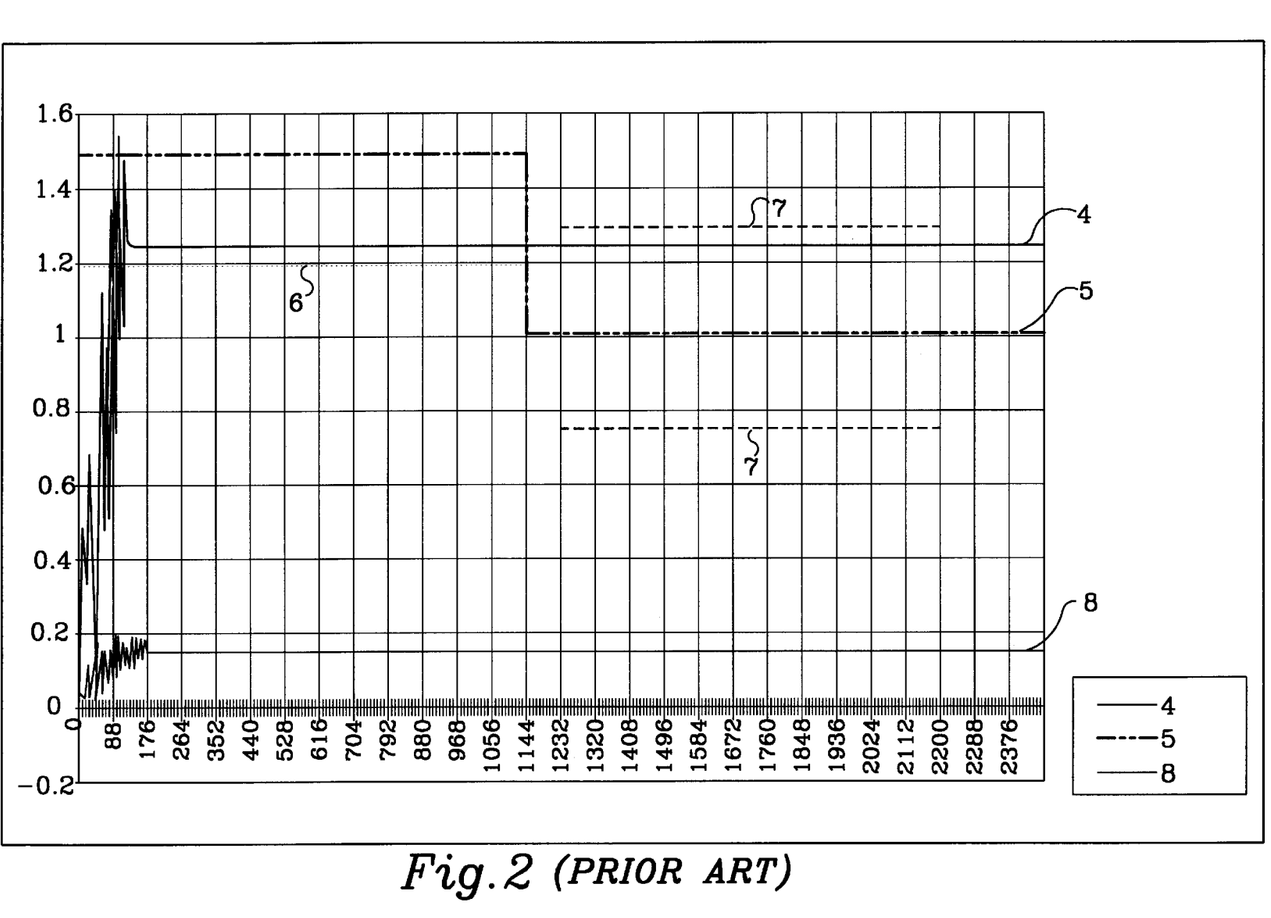
FIG. 2 shows a graphical representation of output for a process including prior art deadband control with significant quasi-steady-state error.

A graph exhibiting a process controlled using this method of hysteresis control is shown in FIG. 2. In this figure, the setpoint 5 is represented by the straight line passing from the left edge of the graph to the center, dropping down and then continuing straight to the right edge of the graph. The signal on the upper part of the graph represents the process output 4. In this case pressure. As the process output approaches the setpoint, it enters into the deadband range. At this point the error ($E_K$) is set to zero, and the controller will provide a fixed control signal. This point is shown as the dotted line on the left side of the graph and may be identified as the lower deadband limit. As the graph shows, however, although the error is set to zero for the system at this point, the process output will actually fall outside the deadband range and then swing back in repetitively for some short period of time until the control equation provides a control signal which causes the process output to remain constantly within the deadband range. This temporary series of perturbations is the result of the process still being in a dynamic rather than steady state, as discussed above.

The above prior art deadband control solution, provides no control over where in the deadband range the oscillation will leave the process output, and in fact the process output may stop as far away from the setpoint as the upper or lower deadband limits. This effectively limits the sensitivity of the controller to setpoint changes. In a worst case, for example, if the process output settles at the lower deadband limit, a change in the setpoint to one-half the deadband range below where the output settled would not be registered by the control system since the error would fall within the new deadband range. (A comparison between the new setpoint and process output would indicate that the process was still operating within the deadband range calculated for the new setpoint.) As one will notice from the right half of the graph in FIG. 2, the second setpoint value is not registered by the prior art deadband control methods.

Overall, in fact, the prior art type of deadband control as indicated by the graphs in FIG. 2, may exhibit larger errors from the setpoint than one using no deadband control assistant at all.

Both problems with the prior systems used for deadband control can be solved by determining with more accuracy, when the system has reached quasi-steady-state, and what value to use for the control signal, once this condition is reached. Recognition of quasi-steady-state thus become the key to developing a solution to the oscillation problem. The applicant has determined that this may be accomplished by determining a deadband range, and monitoring the process to determine when the process output is maintained within this deadband range for a predetermined length of time. The length of time for quasi-steady-state may be found empirically, or may be calculated from known device characteristics. This predetermined length of time is defined as the steady-state-stabilization-time and represents the length of time necessary for the process output to reflect only (or for the most part, only) the conditions existing during quasi-steady-state operation of the process. In other words, the time necessary for the control equation to reach its quasi-steady-state value. Once a steady-state period is identified, a fixed control signal is chosen. Setting error to zero, and any derivative term to zero, is one possible method. Any derivative terms must be set to zero to eliminate control signal spikes which would otherwise occur because of these derivative terms. In an alternative method, the error used in the control equation is set to zero, and the control signal is set to a fixed value—its last calculated value. In the first method, for some applications, there is some delay before the process output stabilizes because setting the error to zero may cause a change in the control signal value. The second method fixes the controller output to its last value, and thus decreases the time it takes the process to stabilize.

Choosing the value of the fixed controller output depends on the controller algorithm and the control objectives. Setting the error to zero and allowing the controller output to stabilize in several time samples produces the best response when a controller equation similar to 1-2 is used and the control objective is to minimize steady state error. If the primary control objective is to minimize actuator wear and tolerate small quantities of steady-state error, it is better to set the error to zero and fix the controller output to the last time sample value. In the case where actuator wear and minimization of steady-state error is of equal importance, the error may be set to zero and the controller output fixed based on the direction and value change (current versus last time sample) of the controller integral term.

The operation of the applicant's invention is now described with reference to a system using equation 1-2 as the control equation. The second term of the equation, which represents the integral error term, relates to the compensation required to substantially reduce the offset of the process output from the setpoint during quasi-steady-state periods. The integral error term however reaches a quasi-steady-state value only after the steady-state-stabilization-time has elapsed. Once this occurs, the integral error term provides an excellent value to determine the control signal, as the integral term at this point forces the process output toward the setpoint effectively by the amount of the maximum possible offset of the process output from the setpoint. (e.g. the maximum oscillation above and below the setpoint.) A slightly improved result may be achieved by adding one-half the actual error existing when the steady-state-stabilization-time elapses, to the integral term. This would improve the result slightly because we know that approximately one-half of this last error produces a control signal which causes overshoot as seen in FIG. 1.

Referring again to equation 1-2, if we set error equal to zero ($E_K=0$), the first term of equation 1-2, involving $E_K$ becomes zero. The third term of equation 1-2 is set to zero to avoid any control signal spikes caused by the $E_{K-EK-1}$ part of the third term. The remaining term in the equation represents the integral error and will remain a constant as long as the error is held at zero. As indicated above, this term reflects the compensation needed to substantially reduce the offset of the process output from the setpoint, and consequently, should produce control signals which minimize the offset from the setpoint. The resulting process control should place the process output substantially closer to the actual setpoint than the old deadband control method of simply zeroing the error at the edge of the deadband range before a proper quasi-steady-state exists.

Figure 3:
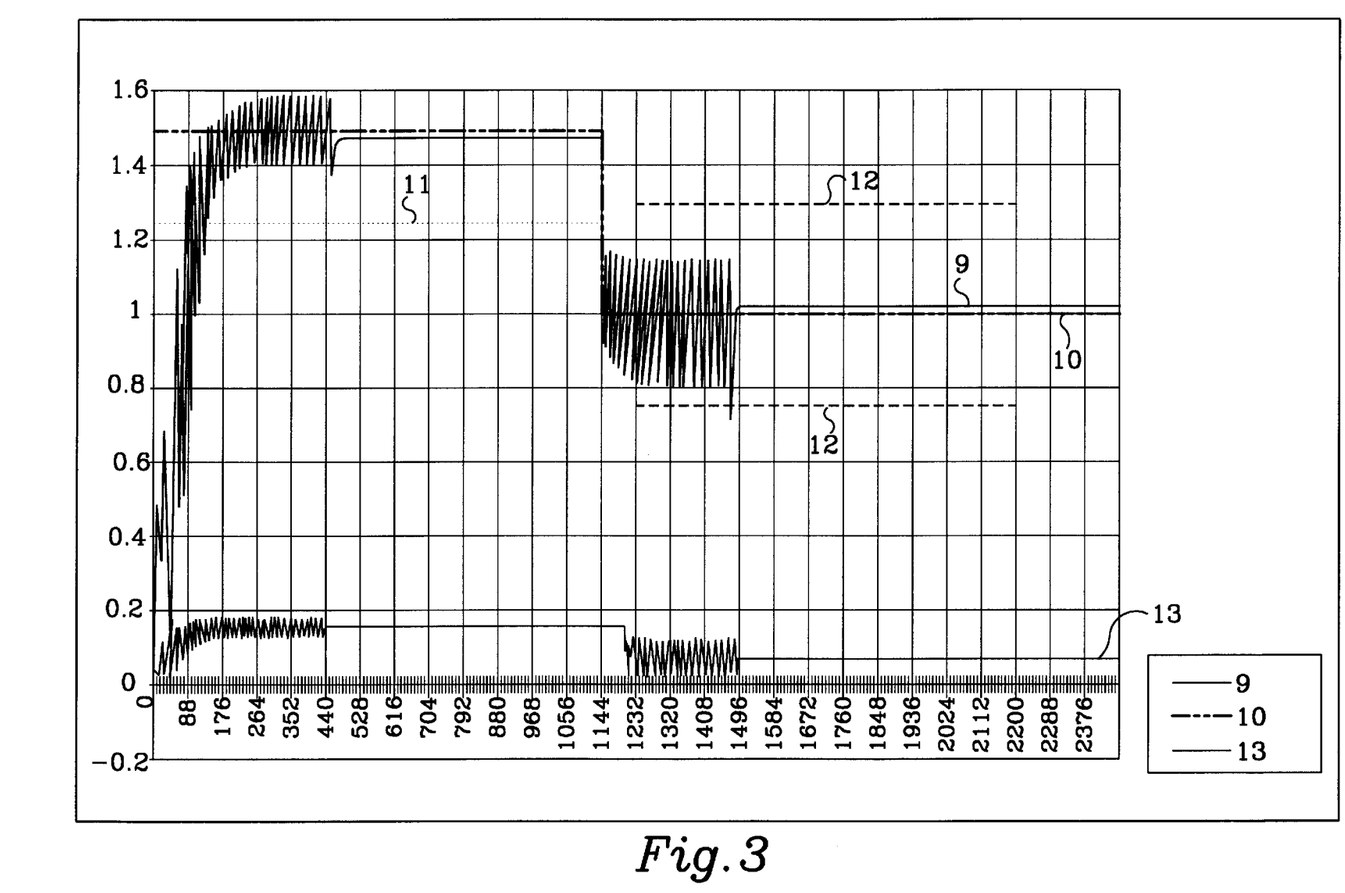
FIG. 3 shows a graphical representation of output for a process achieved by a device using the applicant's invention.

FIG. 3 shows a graph of a process controlled using the deadband control assistant as described by the applicant. The upper signal again represents the process output 9, with the setpoint 10 nearly identical to the process output on the straight portion in the left side of the graph, and only slightly off the setpoint on the right side of the graph. The controller output signal 13, which is the lower graph, now exhibits the needed response which is much better than either the control system with no deadband control, or prior art deadband control assistants. As seen in the figure, the setpoint change occurring near the middle of the graph is recognized using the applicant's deadband control methods, where is was not using the prior art deadband control methods (FIG. 2).

With this new system, we achieve a system in which a larger sensitivity to setpoint changes is achieved. Thus the accuracy of the control system is improved.

Figure 4A:
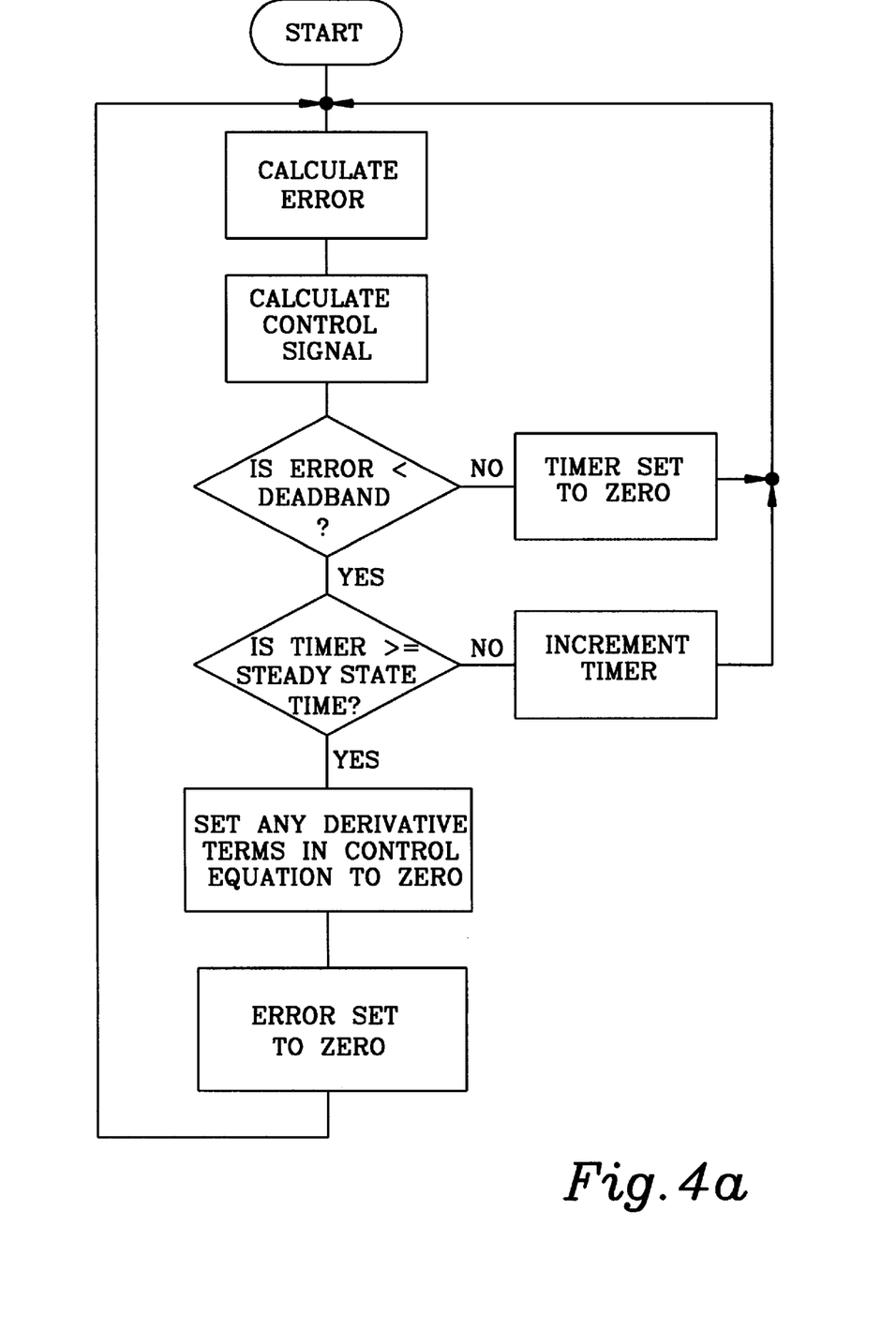
FIG. 4a depicts a flow chart for one embodiment of the applicant process of deadband control.

A preferred embodiment of the invention is now described. FIG. 4 shows a flow chart of one implementation of the applicant's process control, which recognizes a quasi-steady-state condition, and chooses a proper steady-state value for the process output, after a predetermined period of time has elapsed.

During normal operation (non quasi-steady-state), a sample is taken from the process output, and compared to the setpoint to get an error value ($E_K$ or X-W from equation 1-2). The error is then used in equation 1-2 to produce a control equation value ($Y_K$); this value is then applied to the control device. The control device then alters the process according to the control signal received.

To determine if deadband control should occur, the process output is compared with a deadband range predetermined by the process designer. The deadband range should be large enough so that during quasi-steady-state, the process output stays within that range, but not so large that there is an unnecessary sacrifice in sensitivity of the process output to small setpoint changes. If the process output is found to lie outside the deadband range, the process output is still in a dynamic state, or has started moving toward a new setpoint, and deadband control is not initiated.

If the process output is found within the deadband range, a countdown of the steady-state-stabilization-time begins. The steady-state-stabilization-time can be calculated using the controller parameters and information about the dynamic properties of the process. Alternatively, the steady-state-stabilization-time can be found empirically. At each successive sample, the process output continues to be monitored for quasi-steady-state. If the process output wanders outside the deadband range, the countdown is stopped, and normal processing again occurs. If on the other hand, the steady-state-stabilization-time elapses without the process output falling outside the deadband range, steady-state is declared, and deadband control is implemented.

Deadband control is then implemented by setting the error used to calculate the control signals from the control equation is set to zero. The real error value is however still monitored to determine when, or if, the process output falls outside the deadband range. Using equation 1-2 as the control equation, the $E_K$ term used in the control equation causes the first terms to become zero. The integral term is then independently removed from the control equation to prevent control signal spikes. Thus, the integral error term independently determines the control signal until the process output falls outside of the deadband range.

Figure 4B:
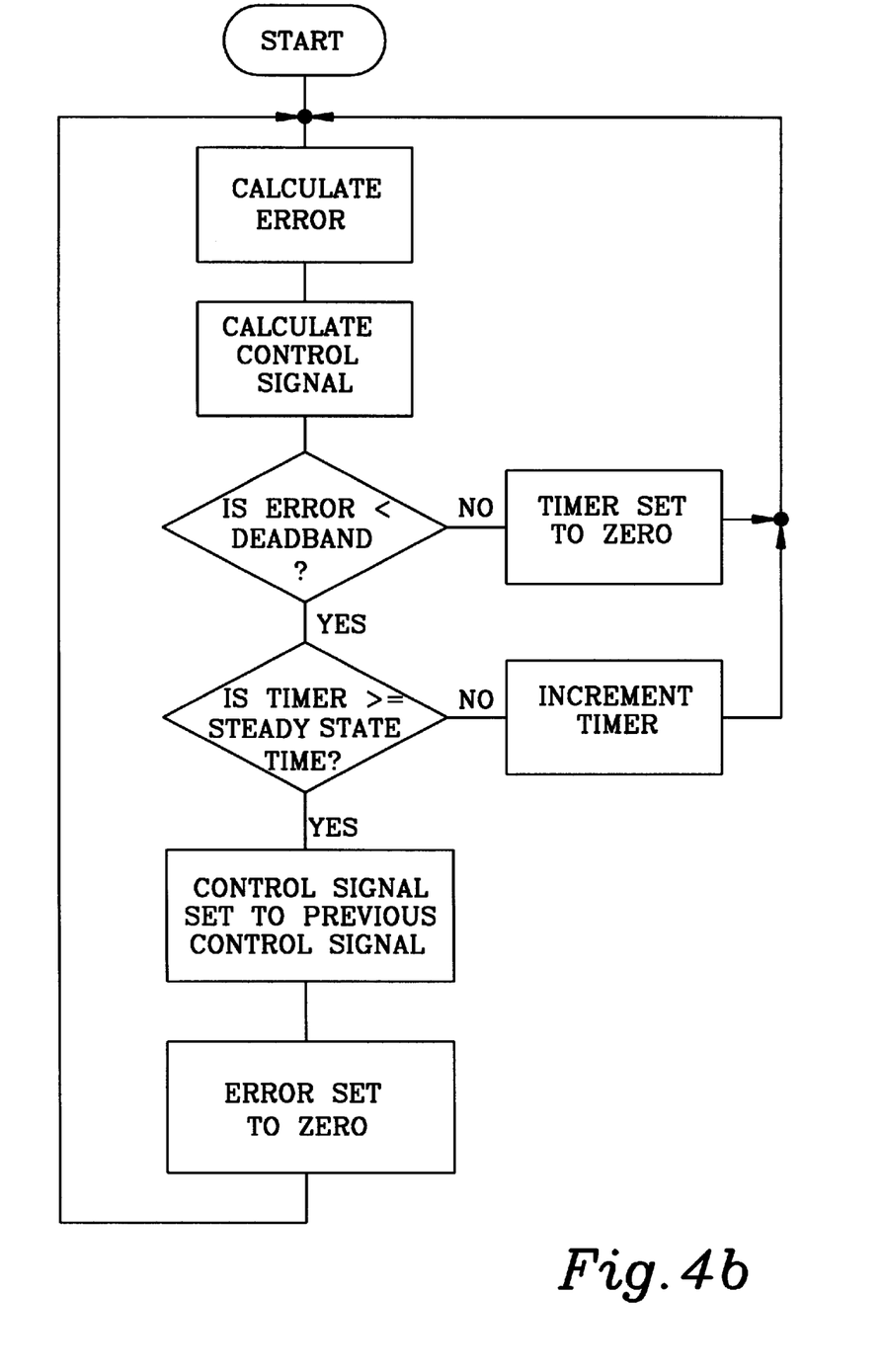
FIG. 4b depicts a flow chart for a second embodiment of the applicant process of deadband control.
Figure 4C:
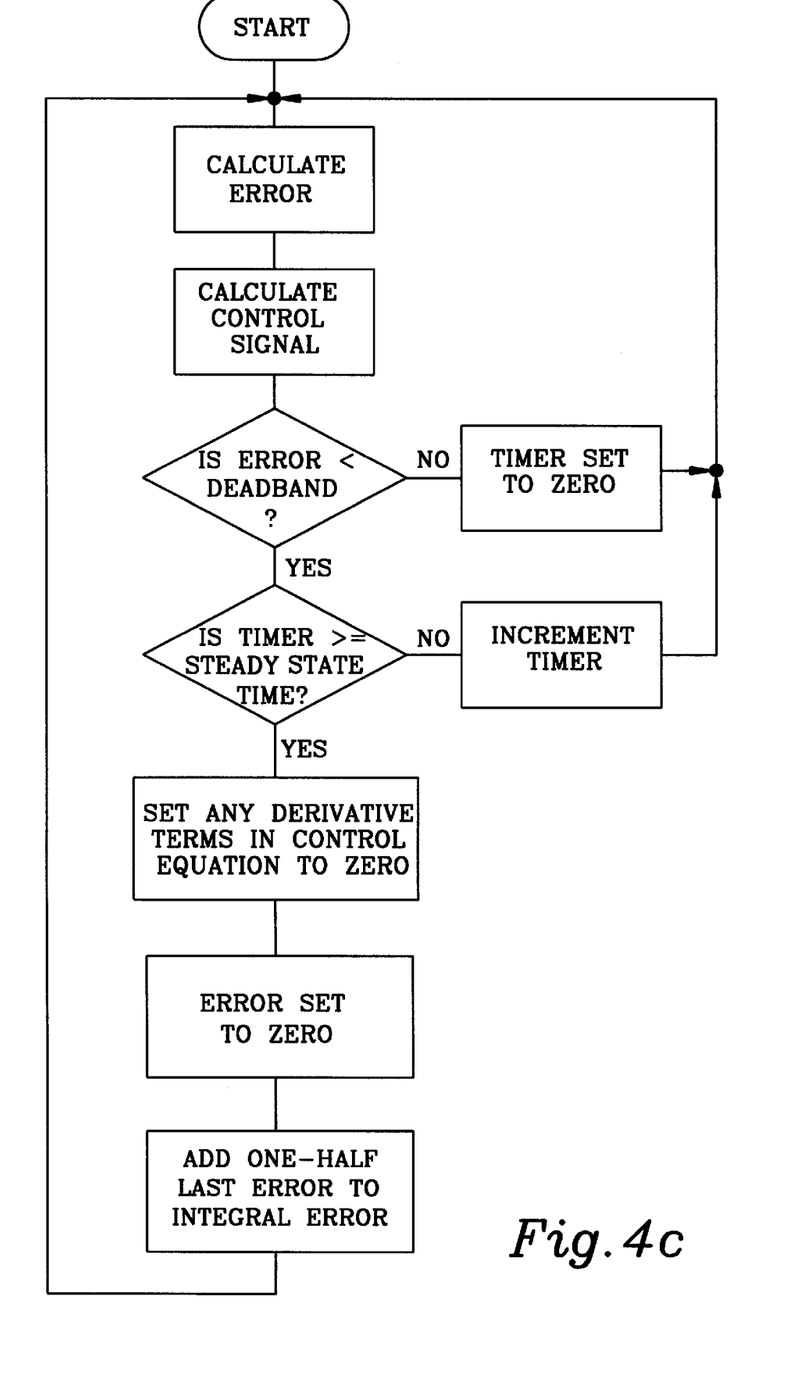
FIG. 4c depicts a flow chart for a third embodiment of the applicant process of deadband control.

FIG. 4b shows a flow chart for an alternative embodiment of the applicant's invention in which the process control signal is set to its previous value, when the error is being set to zero. FIG. 4c shows an improvement on the first embodiment in which one-half the last error when steady-state-stabilization-time lapses is added to the integral error, at the same time that the error is set to zero. As indicated above, choice of a particular implementation may depend on a designer's control objectives.

In accordance with the foregoing description, the applicants have provided a new deadband control assistant apparatus and method which increases accuracy and sensitivity over old systems. Although a particular embodiment has been shown and described in illustrative purposes, other implementations which do not depart from the applicant's teachings will be apparent to those of ordinary skill in the relevant arts. For example, PID control such as that used in equation 1-2 may be replaced with Neural Network control or Fuzzy control. It is intended that protection not be limited to a disclosed embodiment, but only by the terms of the following claims.

The embodiments of the invention in which an exclusive property or right is claimed are defined as follows:

1. An apparatus for eliminating oscillation in a process during a quasi-steady-state condition, the process being controlled using a normal control device during normal conditions by control signals determined using a control equation, the control equation depending on an error in a measured process output to produce the control signals and the error defined by the difference between the measured process output, and a desired process output, comprising:
   means for determining existence of the quasi-steady-state condition in the process, and;
   means for selecting a fixed control signal once the quasi-steady-state condition exists, the quasi-steady-state condition being determined by defining a deadband range around the desired process output, the quasi-steady-state condition being determined to exist when the measured process output enters the deadband range and stays in the deadband range for a predetermined amount of time.

2. The apparatus of claim 1 wherein existence of the quasi-steady-state condition is determined by defining an upper and a lower deadband limit to a deadband range around the desired process output, and declaring the quasi-steady-state condition once the measured process output enters the deadband range, and a predetermined quasi steady-state-stabilization-time elapses.

3. The apparatus of claim 1 wherein the selected fixed control signal represents an integration of the error in the measured process output during the quasi-steady-state condition.

4. The apparatus of claim 1 wherein the selected fixed control signal represents the addition of the of the error in the measured process output during the quasi-steady-state condition, and one-half the error between the last measured process output, and the desired process output prior to the quasi-steady-state condition.

5. The apparatus of claim 4 wherein the selected fixed control signal represents an integration of the error in the measured process output during the quasi-steady-state condition.

6. The apparatus of claim 1 wherein:
   the process is controlled during normal operation using a PID-type controller, including a PID control equation involving at least an error and integral error terms, and;
   the integral error term is isolated from the PID control equation, to create the fixed control signal during periods of quasi-steady-state condition.

7. The apparatus of claim 6 wherein the integral error term of the PID control equation is isolated by setting the error in the PID control equation to zero.

8. The apparatus of claim 7 wherein the PID equation during normal conditions includes a derivative error term, and the derivative error term of the PID control equation is independently set to zero when the error in the PID control equation is set to zero.

9. The apparatus of claim 8 wherein the selected fixed control signal represents the addition of the of the error in the measured process output during the quasi-steady-state condition, and one-half the error between the last measured process output, and the desired process output prior to the quasi-steady-state condition.

10. The apparatus for eliminating oscillation of claim 1 wherein the normal control device comprises a Neural Network controller.

11. The apparatus for eliminating oscillation of claim 1 wherein the normal control device comprises a Fuzzy Logic controller.

12. An apparatus for eliminating oscillation of a process during periods of quasi-steady-state, defined by a process output, and a desired process output, the process controlled by a normal control device during periods of dynamic operation comprising:
   a deadband control assistant, having an upper and a lower deadband limit relative to the desired process output, the deadband control assistant assuming control of the process from the normal control device during quasi-steady-state, quasi-steady-state being declared by the deadband control assistant once the process output remains between the upper and lower deadband limits for a predetermined steady-state-stabilization time.

13. The apparatus for eliminating oscillation of claim 12 wherein the normal control device comprises a PID control equation including error, integral error and derivative error terms.

14. The apparatus for eliminating oscillation of claim 12 wherein the normal control device comprises a Neural Network controller.

15. The apparatus for eliminating oscillation of claim 12 wherein the normal control device comprises a Fuzzy Logic controller.

16. A process of eliminating oscillation in a process during a quasi-steady-state condition, the process, during normal operation conditions controlled by a control equation including at least a term reflecting error of a measured process output from a desired process output comprising the steps of:
   identifying an upper and a lower deadband limit around the desired process output, the upper and lower deadband limits being larger than the degree of oscillation during the quasi-steady-state condition, and;

monitoring the measured process output to determine when a predetermined-steady-state-stabilization-time has passed within the process;

selecting a fixed control signal to replace the result of the control equation for controlling the process.

17. The process for eliminating oscillation in a process of claim 16 wherein the fixed control signal is created by setting the error used in the control equation to zero.

18. The process for eliminating oscillation in a process of claim 16 wherein the fixed control signal is created by fixing the control signal at the last control signal created before the steady-state-stabilization-time has elapsed.

19. The process for eliminating oscillation in a process of claim 16 wherein:

the control equation comprises a PID control equation, including proportional, integral, and derivative error terms, and;

the control signal is fixed by setting the error used in the control equation to zero, and using the integral error term as the control equation.

20. The process for eliminating oscillation in a process of claim 19, including the further step of:

adding one-half of the last error prior to the steady-state-stabilization time to the integral error term before the integral error term is used as the control equation.

21. The process of eliminating oscillation in a process of claim 16, further comprising the step of controlling the process with the control equation once the process output falls outside the upper and lower deadband limits.

22. A method of eliminating oscillation in the process of claim 16 wherein during the normal operation conditions using a Neural Network controller.

23. A method of eliminating oscillation in the process of claim 16 wherein during the normal operations conditions using a Fuzzy Logic controller.

24. An apparatus for eliminating oscillation in a process during a quasi-steady-state condition, the process being controlled during normal conditions by control signals determined using a control equation, the control equation depending on an error in a measured process output to produce the control signals and the error defined by the difference between the measured process output, and a desired process output, comprising:

means for determining existence of the quasi-steady-state condition in the process, and;

means for selecting a fixed control signal once the quasi-steady-state condition exists, the selected fixed control signal representing an integral of the error in the measured process output during the quasi-steady-state condition.

25. An apparatus for eliminating oscillation in a process during a quasi-steady-state condition, the process being controlled during normal conditions by control signals determined using a control equation, the control equation depending on an error in a measured process output to produce the control signals and the error defined by the difference between the measured process output, and a desired process output, comprising:

means for determining existence of the quasi-steady-state condition in the process, and;

means for selecting a fixed control signal once the quasi-steady-state condition exists, the selected fixed control signal representing the addition of the integral of the error in the measured process output during the quasi-steady state condition, and one-half the error between the last measured process output, and the desired process output prior to the quasi-steady-state condition.

* * * * *